Nov. 1, 1955  R. W. DOCHTERMAN  2,722,618
DYNAMOELECTRIC MACHINE
Filed July 8, 1952
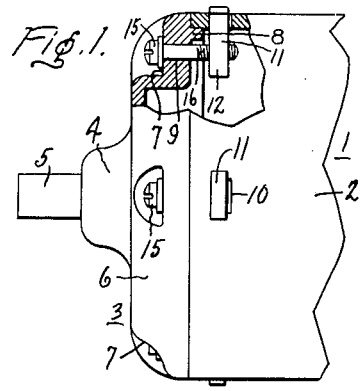
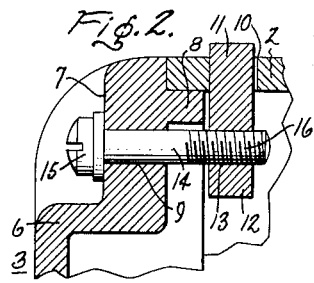
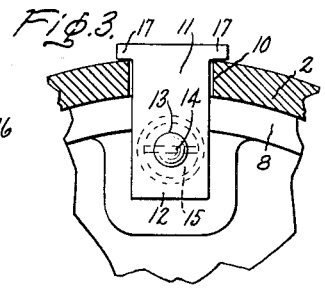
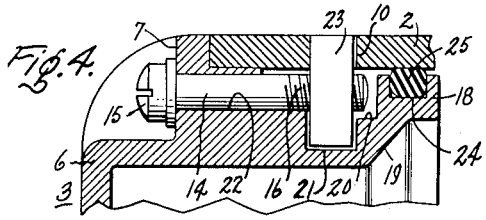
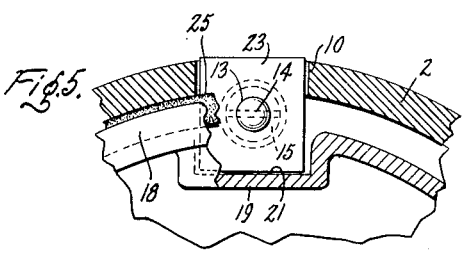
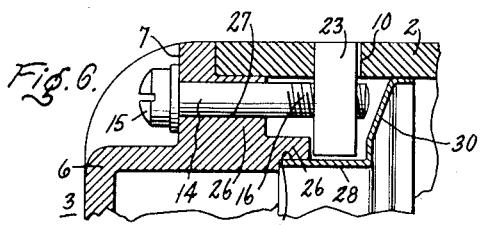
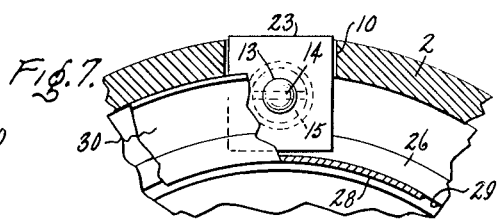
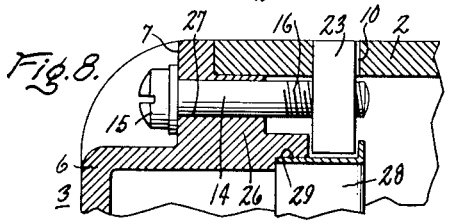
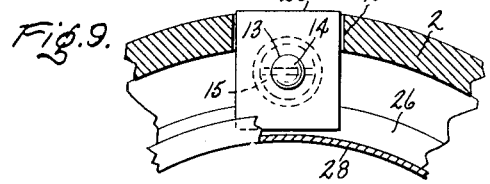
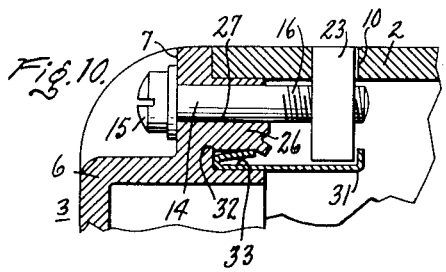
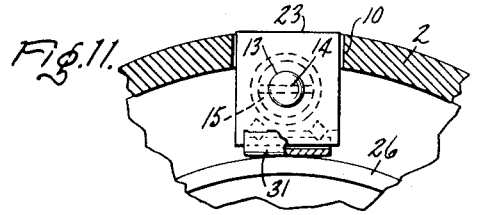
Inventor
Richard W. Dochterman
by
His Attorney United States Patent Office 2,722,618
Patented Nov. 1, 1955

2,722,618

DYNAMOELECTRIC MACHINE

Richard W. Dochterman, Fort Wayne, Ind., assignor to General Electric Company, a corporation of New York Application July 8, 1952, Serial No. 297,705

5 Claims. (Cl. 310—254)

This invention relates to dynamoelectric machines and more particularly to arrangements for securing a dynamoelectric machine end shield to a shell member.

Small dynamoelectric machines, for example, fractional horsepower motors, are conventionally provided with a rotor or armature member mounted on a shaft and surrounded by a stator core member which, in turn, is mounted within a shell member. The bearings for the shaft are mounted in end shields which, in turn, are secured to the shell member in order to hold the machine in assembled relation. In the past, the end shields have been clamped to the shell member by means of a plurality of bolts engaging both end shields and clamping them together tightly to engage the shell member. In some constructions, these bolts are arranged within the shell member passing through openings in the stator core and are thus referred to as thru-bolts. In other arrangements, these bolts have been arranged over the shell member and are thus referred to as over-bolts. In addition to the use of thru- or over-bolts to clamp the end shields to the shell member, end shields have been secured to the shell member by other means such as welding, brazing, or by separate screws engaging tapped holes in the shell member. Frequently, however, the electrical design and physical dimensions of a motor make it mandatory that all of the available space reserved for the stator core be occupied with the iron of the stator core and the copper of the stator windings. In such cases, there is no room for thru-bolt holes in the stator core since the iron that would be displaced thereby cannot be spared from the magnetic circuit. In such a case, the use of over-bolts or one of the other means of securing the end shields to the shell member has thus been dictated. There are designs, however, where it is not desirable to use over-bolts and the alternative methods mentioned above add appreciably to the cost of the machine. Furthermore, even the thru-bolt and over-bolt constructions contribute appreciably to the cost of the motor and it is therefore desirable to provide a construction wherein the end shields are conveniently secured to the shell member and equally readily removable therefrom without the use of thru-bolts, over-bolts, or any of the other methods of attachment previously discussed.

It is therefore an object of this invention to provide an improved dynamoelectric machine construction and more particularly an improved arrangement for securing dynamoelectric machine end shields to the shell member.

Further objects and advantages will become apparent and the invention will be better understood by reference to the following description and the accompanying drawing, and the features of novelty which characterize this invention will be pointed out with particularity in the claims annexed to and forming a part of this specification.

In accordance with the broad aspects of this invention, an end shield member is provided together with a shell member having an opening formed in its circumferential surface. An engaging member is arranged in the shell member opening and extending into the interior of the shell member and a clamping member engages the end shield member and the portion of the engaging member within the shell member thereby to secure the end shield member to the shell member. More specifically, a portion of the engaging member extending within the shell may be provided with a threaded opening therein and another opening is formed in the radially extending portion of the end shield. A clamp bolt is then arranged in the end shield opening threadingly engaging the threaded opening in the engaging member so that the end shield member may be drawn into tight engagement with the shell. Various modified forms of this construction provide for retaining the engaging member in position during assembly of the end shield onto the shell and prior to tightening of the clamping bolt.

In the drawing, Fig. 1 is a side elevational view of a portion of a dynamoelectric machine, partly broken away, showing one form of this improved construction;

Fig. 2 is a fragmentary view, partly in section, illustrating the construction of Fig. 1 in greater detail;

Fig. 3 is a fragmentary cross-sectional view of the construction of Figs. 1 and 2;

Fig. 4 is a fragmentary side elevational view, partly in section, illustrating a modified form of this invention;

Fig. 5 is a fragmentary cross-sectional view illustrating the construction of Fig. 4;

Fig. 6 is a fragmentary side elevational view, partly in section, illustrating another form of this improved construction;

Fig. 7 is a fragmentary cross-sectional view of the construction of Fig. 6;

Fig. 8 is a fragmentary side elevational view, partly in section, illustrating a further form of this invention;

Fig. 9 is a fragmentary cross-sectional view illustrating the construction of Fig. 8;

Fig. 10 is a fragmentary side elevational view, partly in section, illustrating yet another form of this invention and;

Fig. 11 is a cross-sectional view showing the construction of Fig. 10.

Referring now to Figs. 1, 2 and 3, there is shown a dynamoelectric machine 1 having a cylindrical shell member 2 and an end shield member 3. The end shield member 3 has a bearing hub 4 formed integral therewith in which the bearing (not shown) which supports the rotatable shaft 5 is arranged. The end shield member 3 has a radially outwardly extending portion 6 in which a plurality of bosses 7 are formed. An annular flange 8 is formed on the radial portion 6 of the end shield 3 and an axially extending opening 9 is formed in each boss 7. In order to secure the end shield 3 to the shell 1, a plurality of openings 10 are formed in the circumferential surface of the shell member 2 adjacent the end thereof and the shell member is positioned over the annular flange 8, thus forming a rabbet connection. An engaging member 11 is arranged in each of the openings 10, each of these members having an inwardly extending portion 12 having a threaded opening 13 formed therein. A clamp bolt 14 is arranged in the opening 9 in the boss 7 of the end shield 3 with a slotted head 15 engaging the outer surface of the boss 7 and with a threaded portion 16 threadingly engaging the threaded opening 13 in the engaging member 11. In order to retain the engaging members 11 in the openings 10 in the shell 2, enlarged portions 17 are formed at the upper end and engaging the portions of the shell 2 adjacent the openings 10.

It will now be readily seen that the action of this device is similar to that of a jack, i. e., as the clamping bolts 14 are tightened, they move the engaging members 11 toward the screw head until they come in contact with the surfaces of the slots 10 adjacent the end shield 3. Further tightening of the screw serves to clamp the shell and end shield together between the screw head and the engaging member.

Referring now to Figs. 4 and 5 in which like elements are indicated by like reference numerals, it is seen that an annular flange 18 is formed on the inner side of the radially outwardly extending portion 6 of the end shield 3 with a plurality of projections 19 formed on the underside thereof extending inwardly from the bosses 7. The annular flange 18 is again spaced from the outer periphery of the end shield member to provide a rabbet connection for the shell member 2. An annular groove 20 is formed in the flange portion 18 with slots 21 respectively formed in each of the projections 19 communicating with the annular groove 20. A plurality of axially extending openings 22 are respectively formed in the bosses 7 and extending through the annular flange 18 to communicate with the annular groove 20. Square nuts 23 are respectively positioned in the openings 10 in the shell member 2 with their threaded openings 13 being arranged in the annular groove 20 and their lower extremities in the positioning slots 21 in the boss extensions 19. Clamp bolts 14 are arranged in the end shield openings 22 with their threaded ends 16 engaging the threaded openings 13 in the square nuts 23 and with their heads 15 engaging the outer surfaces of the bosses 7. Here, the slots 21 and the boss extensions 19 serve to locate and retain the square nuts 23 until the clamping bolts are engaged therewith. As an additional feature of this construction, the outer extremity of annular flange 18 has another annular groove 24 formed therein with an O-ring 25 of resilient material positioned therein forming a seal with the inner surface of the shell member 2. This assembly may therefore be used in a totally enclosed motor construction to insure a leak-proof motor cavity.

Referring now to Figs. 6 and 7 in which like elements are again indicated by like reference numerals, it is seen that annular flange 26 is formed on the inner surface of the radially outwardly extending portion 6 of the end shield 3 and again is spaced from the outer periphery in the end shield in order to provide a rabbet connection for the shell member 2. Here, a plurality of axially extending openings 27 are formed in the boss portions of the end shield 3 extending through the annular flange 26. Square nuts 23 are again arranged in openings 10 in the shell 2 extending inwardly so that their threaded openings are engaged by the threaded ends 16 of clamp bolts 14. Here, the square nuts 23 are retained in position until engaged by the clamp bolts 14 by an annular baffle member 27 pressed into an annular groove 28 in the inner surface of the annular flange 26. The annular baffle 27 has an outwardly extending portion 29 arranged with a very small clearance with the inner surface of the shell member 2 to provide an explosion-proof construction.

Referring now to Figs. 8 and 9, there is shown a construction quite similar to that shown in Figs. 6 and 7 in which the baffle 27 is not provided with an outwardly extending portion 29. This construction may be used for open motors as contrasted with the construction of Figs. 4 and 5 which is suitable for completely sealed motors and the construction of Figs. 6 and 7 which is suitable for totally enclosed explosion-proof motors.

In Figs. 10 and 11, the square nuts 23 are retained in position by retaining members 30, which may be formed as a wire bender part, inserted in openings 31 formed in the inner surface of annular flange 26. The inner end of the retainer members 29 may be bent double, as at 32, thus tightly to secure the retainer members 29 within the openings 31.

It will now be readily seen that this invention provides a simple arrangement for securing a motor end shield to the shell without the use of either thru- or over-bolts and without the necessity for welding or brazing the end shield to the shell or for forming tapped holes in a boss or flange portion on the shell. Furthermore, this arrangement permits one end shield to be removed without removing the other end shield and in addition provides a construction which is more economical than the arrangements previously used.

While I have shown and described particular forms of this invention, modifications and improvements thereof will occur to those skilled in the art. I desire it to be understood, therefore, that this invention is not limited to the forms shown and I intend in the appended claims to cover all modifications which do not depart from the spirit and scope of this invention.

What I claim as new and desire to secure by Letters Patent of the United States Patent Office is:

1. In a dynamoelectric machine, an end shield member having a radially extending portion with an axially extending flange portion formed thereon and spaced from the outer periphery of said radially extending portion, said radially extending portion having an axially extending opening formed therein extending through said flange portion, said flange portion having a groove formed in the outer surface thereof communicating with said axial opening, a shell member engaging the outer surface of said flange portion and having an opening formed in its circumferential surface, an engaging member arranged in said shell member opening and exteding into the interior of said shell member with a threaded opening formed thereon, said clamping member being also positioned in said flange portion groove, and a clamping member arranged in said end shield member opening and threadingly engaging said engaging member opening thereby to secure said end shield member to said shell member.

2. In a dynamoelectric machine, an end shield member having a radially extending portion, said radially extending portion having an axially extending projection formed on one side thereof and spaced from the outer periphery of said radially extending portion, said radially extending portion having an axially extending opening formed therein extending through said projection, said projection having a groove formed in its outer surface communicating with said axial opening, a shell member engaging the outer surface of said projection and having an opening formed in the circumferential surface, an engaging member arranged in said shell member opening and extending into the interior of said shell member with a threaded opening formed therein, said engaging member also being positioned in said groove in said projection, and a clamping member arranged in said end shield member opening and threadingly engaging said engaging member opening, thereby to secure said end shield member to said shell member.

3. In a dynamoelectric machine, an end shield member having a radially extending portion with an axially extending flange portion formed thereon and spaced from the outer periphery of said radially extending portion, said radially extending portion having an axially extending opening formed therein extending through said flange portion, a shell member engaging the outer surface of said flange portion and having an opening formed in the circumferential surface, an engaging member arranged in said shell member opening and extending into the interior of said shell member with a threaded opening formed therein, a clamping member arranged in said end shield member opening and threadingly engaging said engaging member opening thereby to secure said end shield member to said shell member, and an axially extending member secured to said flange portion having a portion arranged under said engaging member thereby to retain said engaging member in said shell member opening.

4. In a dynamoelectric machine, an end shield member having a radially extending portion with an axially extending flange portion formed thereon and spaced from the outer periphery of said radially extending portion, said radially extending portion having an axially extending opening formed therein extending through said flange portion, a shell member engaging the outer surface of said flange portion and having an opening formed in the circumferential surface thereof, an engaging member arranged in said shell member opening and extending into the interior of said shell member with a threaded opening formed therein, a clamping member arranged in said shell member opening and threadingly engaging said engaging member opening thereby to secure said end shield member to said shell member, and a baffle member secured to said flange portion having a portion arranged under said engaging member thereby to retain said engaging member in said shell member opening, said baffle member having a portion extending outwardly toward said shell member on the side of said engaging member remote from said end shield member.

5. In a dynamoelectric machine, an end shield member having a radially extending portion with an axially extending flange portion formed thereon and spaced from the outer periphery of said radially extending portion, said radially extending portion having an axially extending opening formed therein extending through said flange portion, a shell member engaging the outer surface of said flange portion and having an opening formed in its circumferential surface, flange means formed on said flange portion, said flange means being arranged to extend axially in spaced relation with said shell member and within the same, an engaging member having a threaded opening formed thereon arranged in said shell member opening and extending into the interior of said shell member, and a clamping member arranged in said end shield member opening and threadingly engaging said engaging member opening thereby to secure said end shield member to said shell member, said clamping member being arranged to extend between said shell member and said flange means, said flange means being positioned to retain said engaging member in said shell member opening.

References Cited in the file of this patent

UNITED STATES PATENTS

| | | |
|---|---|---|
| 1,411,442 | Leece | Apr. 4, 1922 |
| 2,076,066 | Clay | Apr. 6, 1937 |

FOREIGN PATENTS

| | | |
|---|---|---|
| 492,434 | Great Britain | Sept. 20, 1938 |
| 517,838 | Germany | Feb. 7, 1931 |
| 268,965 | Italy | Nov. 5, 1929 |